Dec. 29, 1931.  T. A. WALSH, JR  1,838,646
OPHTHALMIC MOUNTING
Filed April 11, 1928

Inventor
Thomas A. Walsh, Jr.
By Harry H. Styll.
Attorney

Patented Dec. 29, 1931

1,838,646

UNITED STATES PATENT OFFICE

THOMAS A. WALSH, JR., OF NEW YORK, N. Y., ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC MOUNTING

Application filed April 11, 1928. Serial No. 269,127.

This invention relates to improvements in ophthalmic mountings and has particular reference to improved means for connecting the lens holding means of said mountings.

The principal object of the invention is to provide improved means by which the distance between the lens holding means of an ophthalmic mounting may be adjusted.

Another object of the invention is to provide an improved ball and socket connecting means between the lens holding means of an ophthalmic mounting which may be adjusted to produce the required distance between the lenses.

Another object of the invention is to provide improved bridging means for an ophthalmic mounting which may be automatically adjusted without bending to produce the required distance between the lenses.

Another object of the invention is to provide improved means for changing the distance between the lenses without bending, which adjustment will be permanent until intentionally changed.

Another object of the invention is to provide improved connecting means for the lenses of the chain or flexible type bridge so that the lens holding means may be folded compactly for placing in the pocket or case.

Other objects and advantages of the invention will become apparent from the following description taken in connection with the accompanying drawings, and it will be understood that many changes may be made in the arrangements of parts and details of construction without departing from the spirit of the invention as set forth in the accompanying claims. I, therefore, do not wish to be limited to the exact arrangements and details shown and described as the preferred forms only have been shown by way of illustration.

Referring to the drawings.

In the prior art the distance between lenses of ophthalmic mountings has been changed broadly by two means. In the first method the lens holding means were connected by positive means which were soft and ductile and could be bent and the distance between the lenses could be changed by bending the connecting means. This is a difficult adjustment to make, being particularly hard to get some desired adjustments. In the second method the lens holding means were connected by a chain or cord-like method which could be twisted to change the distance between the lens holding means or eye cups and while the desired distance could be obtained this way by twisting the adjustment was immediately lost when the mounting was removed from the face and adjustment had to be made each time that the individual put on the mounting.

It is, therefore, the prime object of my invention to provide means that will change the distance between the lenses and which will not get out of adjustment each time the mounting is put on by the wearer; in other words, the adjustment between the lenses is permanent until the wearer changes it to some other distance. Another great advantage of my invention is that the bridging means is of the so-called chain or flexible type which allows the mounting to be folded compactly so that it may be placed in the pocket or in a case. In other words, I obtain all the advantages of the chain or flexible type bridge with a permanent setting for the distance between them.

Figure 4:
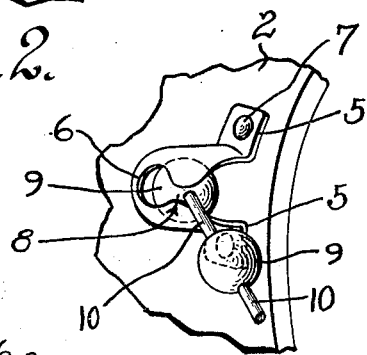
Fig. 4 is a fragmentary perspective showing the assembly of the bridge connection.

Referring to the drawings, wherein similar reference characters denote corresponding parts throughout, the lenses 1 are held in a lens rim or eye cup 2 in the usual manner. The eye cups are provided with the head band 3 for holding the mounting on the face of the wearer. On each of the eye cups is provided a staple 4 which is preferably made of sheet material pressed into form to have a flat spherical seat 6 and having the extending foot members 5 which are secured to the eye cups 2 by the rivets 7 or by other attaching means. The spherical seat or socket 6 is split so as to provide an opening 8. The bridging member comprises a plurality of hollow ball members 9 which are made of thin sheet material and these hollow ball members are connected by a loose link 10 which is headed over at 11 on the inside of the ball members so as to produce a loose connection so that the series of connected balls have somewhat the action of a link chain. The balls 9 are made of a size to fit in the spherical seat 6. Access of the balls to the spherical seat 6 is had by means of the opening 8 which permits of the link 10 being slipped therethrough so that the ball 9 may be seated in the spherical seat 6 as shown in Fig. 4. If desired a tubular member 12 of soft rubber or other soft material may be slipped over the ball members comprising the bridging portion. This provides a soft contact for the nose.

Figure 1:
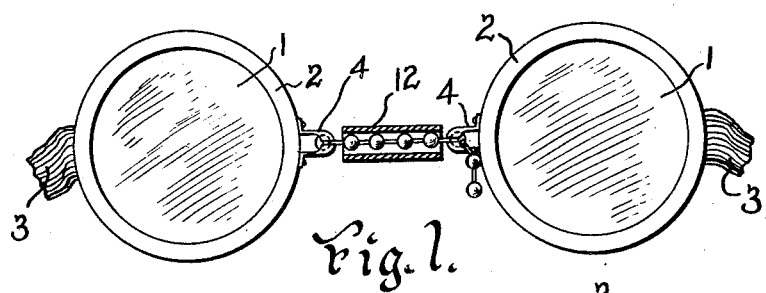
Fig. 1 is a front view of an ophthalmic mounting partially in section showing the invention applied thereto.
Figure 2:
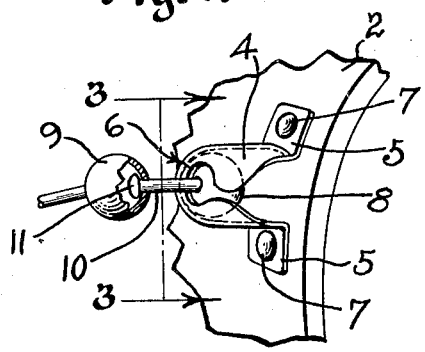
Fig. 2 is a fragmentary enlarged portion of the bridge connection shown in perspective.
Figure 3:
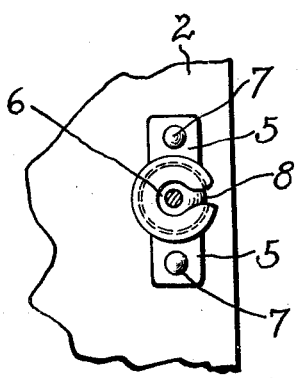
Fig. 3 is a section on line 3—3 of Fig. 2 looking in the direction of the arrows.
Figure 5:
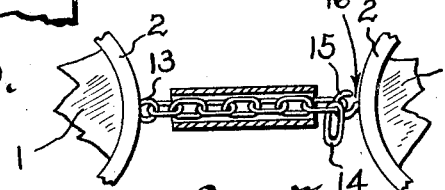
Fig. 5 is a fragmentary view similar to Fig. 1 showing a modification of the invention.

In Fig. 5, I have shown a modification of the invention comprising an eyelet 13 secured to the lens holding member 2 on the left hand side and a link chain bridge member 14 connected to the eyelet 13. To the lens holding member 2 on the right hand side of the figure I have secured the open hook member 15 which is capable of engaging with the various links of the chain bridge member 14. If desired the hook member 15 may be made of ductile bendable material so that the open space 16 between the end of the hook 15 and the lens holding member 2 may be closed if desired. This device is operated by placing the desired link of the bridge member 14 in the hook 15 and if the hook is made of ductile material bending the hook to close up the space 16; to remove the bridge member 14 the hook may be bent to open the space 16 and the engaging link removed therefrom. The operation and result of this device are similar to that shown in Fig. 1.

The operation of the device is as follows: One of the balls 9 is slipped into the seat 6 on one side of the mounting; then another ball 9 is selected which will give the desired distance between the lenses and that is slipped in the seat 6 on the other side of the mounting, the seat 6 being arranged in conjunction with the opening 8 so as to hold the balls in place and prevent their easily coming out. It will be seen that as all the balls 9 will fit in the seat 6 any desired distance between the lenses may be obtained simply by selecting the desired ball for contact with the seat.

While I have shown the bridging member connected on both sides by the separable ball member, if desired the bridging member may be positively secured on one side allowing the whole adjustment for distance between the lenses to be made on the other side.

From the foregoing description it will be seen that I have provided simple, efficient and economical means for connecting the lenses of an ophthalmic mounting with means by which the distance between the lenses may be readily changed as desired, and that the construction is well adapted for obtaining all the advantages of the invention.

Having described my invention, I claim:

1. In a device of the character described, a pair of lens holding members, a flexible bridging member comprising a plurality of ball members connected by loose link members, and a connecting member on one of the lens holding members having a socket formed with a slotted wall adapted to receive and hold each of the ball members individually to shorten or lengthen the bridging member to regulate the distance between the lens holding members.

2. In a device of the character described, a pair of lens holding members, a flexible bridging member comprising a plurality of ball members connected by loose link members, and a connecting member on each of the lens holding members having a socket formed with a slotted wall adapted to receive and hold each of the ball members individually to shorten or lengthen the bridging member to regulate the distance between the lens holding members.

3. In a device of the character described, a pair of lens holding members, a flexible bridging member comprising a plurality of hollow ball members connected by loose links headed over on the inside of the ball, and a connecting member on one of the lens holding members comprising a cupped member having a slotted wall through which the loose links may enter to allow the ball members to be individually positioned in the cupped member to regulate the distance between the lens holding members.

4. In a device of the character described, a pair of lens holding members, a flexible bridging member comprising a plurality of hollow ball members connected by loose links headed over on the inside of the ball, and a connecting member on each of the lens holding members comprising a cupped member having a slotted wall through which the loose links may enter to allow the ball members to be individually positioned in the cupped member to regulate the distance between the lens holding members.

5. In a device of the character described, a pair of lens holding members, a flexible bridging member connecting the lens holding members comprising a plurality of flexible links and a connecting member on one of the lens holding members comprising an open hook spaced at one side from the lens holding member and adapted to interengage with each of the links to regulate the distance between the lens holding members without changing the relationship of any of the parts.

6. In a device of the character described, a pair of lens holding members, a flexible bridging member connecting the lens holding members comprising a plurality of flexible links and a connecting member on each of the lens holding members comprising an open hook on one member spaced at one side from the lens holding member and a closed ring on the other, the open hook being adapted to interengage with each of the links to regulate the distance between the lens holding members without changing the relationship of any of the parts.

7. In a device of the character described, a pair of lens holding members, a plurality of spaced members forming a single flexible bridging member extending between the lens holding members, a connecting member on one of said lens holding members forming a permanent connection with one end of the flexible bridging member, and a connecting member on the other lens holding member having an open side adapted to engage individually each of the spaced connecting members of the bridge member to shorten or lengthen it and regulate the distance between the lens holding members without changing relationship of any of the parts of the connecting member on the lens holding means.

THOMAS A. WALSH, Jr.